United States Patent
Holmes et al.

(10) Patent No.: US 6,656,623 B2
(45) Date of Patent: Dec. 2, 2003

(54) LOW-COST ATMOSPHERIC SOFC POWER GENERATION SYSTEM

(75) Inventors: Randall A. Holmes, Saltsburg, PA (US); Paolo R. Zafred, Murrysville, PA (US); James E. Gillett, Greensburg, PA (US); Robert Draper, Pittsburgh, PA (US); Louis K. Lau, Monroeville, PA (US); Richard A. Basel, Pittsburgh, PA (US); Robert L. Cather, Monroeville, PA (US); Vinod B. Doshi, Monroeville, PA (US); James M. Toms, Irwin, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 233 days.

(21) Appl. No.: 09/784,610

(22) Filed: Feb. 15, 2001

(65) Prior Publication Data

US 2002/0110716 A1 Aug. 15, 2002

(51) Int. Cl.$^7$ .......................... H01M 8/00; H01M 8/09; H01M 2/00; H01M 2/02; H01M 2/14
(52) U.S. Cl. ..................... 429/30; 429/17; 429/31; 429/34; 429/38
(58) Field of Search .................. 429/30, 34, 26, 429/35, 163, 175, 177, 17, 38, 39, 31

(56) References Cited

U.S. PATENT DOCUMENTS 4,374,184 A * 2/1983 Somers et al. ............... 429/17
4,431,715 A 2/1984 Isenberg
4,664,986 A 5/1987 Draper et al.
4,808,491 A 2/1989 Reichner
4,876,163 A 10/1989 Reichner
5,169,730 A * 12/1992 Reichner et al. ............. 429/20
5,244,752 A 9/1993 Zymboly et al.
5,314,762 A * 5/1994 Hamada et al. .............. 429/37
5,573,867 A 11/1996 Zafred et al.
5,733,675 A 3/1998 Dederer et al.
5,741,605 A 4/1998 Gillett et al.
6,001,761 A * 12/1999 Hata et al. ................. 501/103

FOREIGN PATENT DOCUMENTS

EP          0055011          8/1981

* cited by examiner

Primary Examiner—Patrick Ryan
Assistant Examiner—Julian Mercado

(57) ABSTRACT

A solid oxide fuel cell generator (10) contains stacks (20) of hollow, tubular axially elongated fuel cells (36) which can operate to generate electricity; a single oxidant inlet plenum (52) including a bottom enclosing member, having hole therethrough which acts as an oxidant feed tube positioning board (77); a fuel inlet plenum (11); an oxidant/fuel exhaust chamber (94); power leads (32) electrically connected to the fuel cells transverse to the axis (36') of the fuel calls; and a plurality of oxidant feed tubes (51); all surrounded by insulation (76); where there are at least two fuel cell stacks arranged in a row next to each other, the oxidant feed tube positioning board at the bottom of the oxidant inlet plenum is a laminate of layers of porous alumino-silicate ceramic fibers bonded with a ceramic alumina binder and dense woven ceramic (78) impregnated with ceramic adhesive (79), and wherein the insulation constitutes, primarily, bulk ceramic fibers.

7 Claims, 3 Drawing Sheets

US 6,656,623 B2

LOW-COST ATMOSPHERIC SOFC POWER GENERATION SYSTEM

BACKGROUND OF THE INVENTION

1. Field of the Invention

This invention relates generally to improved oxidant feed plenums and power lead cooling for tubular solid oxide fuel cells (SOFCs) disposed in a fuel cell generator.

2. Background Information

High temperature, solid oxide electrolyte fuel cell generators, which are made of mostly ceramic components, including supported tubular fuel cells and oxidant/air feed tube conduits, and which allow controlled leakage among plural chambers in a sealed housing, are well known in the art, and are taught, for example, in U.S. Pat. No. 5,573,867 (Zafred, et al., which taught recirculation of spent fuel through a recirculation channel to mix with feed fuel at an internal ejector/pre-reformer). Oxidant/air feed tube conduit support systems were taught in U.S. Pat. Nos. 4,664,986, and 5,733,675 (Draper, et al., and Dederer, et al., respectively) and also in U.S. Pat. Nos. 4,808,491 and 4,876,163 (both Reichner). The prior art system of Draper et al. taught welding metal air feed tube conduits to associated metal subheader plenums, providing a rigid, metal feed tube support system.

In the prior art Reichner system, as shown in FIG. 1 of the present application (and as generally shown in FIG. 1A of the Reichner '491 patent), oxidant/air feed 50 flowed into top metal oxidant/air distribution plenum 52 and then into further oxidant/air distribution plenums 52', where the oxidant/air then passed downward into fuel cells via individual ceramic oxidant feed tubes 51. At the top of the oxidant feed tubes 51, spherical supports 70 kept the oxidant feed tubes in place. These spherical supports required a machined spherical seat 72 in the Inconel plenum wall 74 at the bottom of the plenums 52'. Insulation 76, in a brick like configuration, surrounded the plenums. Steel outer generator enclosure 85 surrounded the fuel cell generator. Exhaust gas passages are shown as channels 80 and the bottom lower plenum enclosure insulation board is shown as 82, supporting the bottom of metal plenum 52'. Also shown are tubular fuel cells 36, metal wool interconnection material 34, which was attached to the top, bottom and sides of the fuel cells and which connected to vertical internal metal D.C. power leads 32 through metal cables 34 and series vertical metal connection plate 17. Inner metal canister 6 and pre-heating combustion chamber 94 are also shown. Feed fuel 12 passed upwards along the outside of the fuel cells 36, with part of the spent fuel 14 being recirculated and part of the spent fuel 16 being passed into combustion chamber 94.

The Draper et al. feed tube support system design was very expensive, very heavy, and required major machining and welding of Inconel components. The Reichner design also required substantial machining to properly set the spherical support and the D.C. power leads 32 required active cooling to dissipate heat as a result of high ambient temperature and ohmic losses associated with the internal metal wool interconnections shown as 34. As the number of fuel cells increase, so the voltage at the module terminals would require complex cooling of all the internal power leads. U.S. Pat. No. 4,431,715 (Isenberg) solved many power lead problems but not the cooling problem associated with large SOFC generators.

Internally, the SOFC generator module of the present 100 kw class design includes a plurality of metallic air manifolds, located right above the fuel cell bundles/stacks, which are designed to uniformly distribute process air to each of the fuel cells within the stack. As the number of stacks is increased to produce more power, so is the number of metal manifolds required which must be branched to larger upper metal manifolds to provide equal flow distribution. As an example, a 1 MW generator module with five 100 kW size stacks of the present design would require 40 small metallic air manifolds, coupled to 10 intermediate metal manifolds which must be then connected to 2 or more larger metal air plenums. This proliferation of metal manifolds and metal branch systems results in high pressure losses, difficult high temperature sealing problems, complex support structures to support the heavy metal manifolds and overall high manufacturing costs. Additionally, the use of cut brick type blocks of ceramic insulation, shown as 76 in FIG. 1, while helping to provide support for the fuel cell stacks during shipping adds significantly to overall cost of the generator.

Another problem with current SOFC systems is the external ducting arrangements required to couple steamers, recuperators, preheaters and the like which reduces overall efficiency and causes substantial heat losses. Although U.S. Pat. No. 5,741,605 (Gillett, et al.) introduced modular concepts including a pre-assembled, self-supporting removable modular fuel cell stack, such major components as turbine/generators, compressors and recuperators, were separated from the fuel cells and still required substantial ducting.

What is needed is an improved, simpler, less expensive oxidant/air feed tube and support system that will require no metal finishing, a power lead design that minimizes cooling requirements, and better utilization of the interior insulation. It would also be desirable to eliminate external ducting to auxiliaries such as blowers, air preheaters and recuperators. Therefore, it is one of the main objects of this invention to provide a simpler, significantly less expensive oxidant/air feed tube support system which requires minimal or no metal finishing. It is also a main object of this invention to provide power lead designs requiring less cooling and a new insulation design.

SUMMARY OF THE INVENTION

These and other objects of the invention are accomplished by providing a solid oxide fuel cell generator characterized in that it comprises: (1) stacks of hollow, tubular axially elongated fuel cells having an open top and closed bottom, with interior air electrodes and exterior fuel electrodes with solid electrolyte therebetween, which can operate on feed oxidant and feed fuel to generate electricity; (2) a single oxidant inlet plenum formed by enclosing insulation, including a bottom enclosing member having holes therethrough constituting an oxidant feed tube positioning board, located at the top portion of the fuel cell generator; (3) fuel inlet plenum, located at the bottom portion of the fuel cell generator; (4) reacted oxidant/fuel exhaust chamber, located above the fuel cells and below the oxidant inlet plenum; (5) power leads electrically connected to the fuel cells transverse to the axis of the fuel cells; and (6) a plurality of low-cost oxidant feed tubes supported by the oxidant feed tube positioning board and passing through the reacted oxidant/fuel exhaust chamber into the center of the fuel cells; all surrounded by insulation; and all within an outer generator enclosure; where there are at least two fuel cell stacks arranged in a row next to each other, the oxidant feed tube positioning board at the bottom of the oxidant inlet plenum is a composite sandwich of thin woven ceramic fiber sheets impregnated with ceramic adhesive bonded to a thick porous core of alumino-silicate ceramic fibers bonded with an inorganic binder, wherein the insulation constitutes, primarily, bulk ceramic fibers. The core of the oxidant feed tube positioning board is preferably a vacuum formed alumino-silicate fiber board. When laminated with a ceramic, woven sheet on both faces, it is an extremely stiff, lightweight structure with substantial strength and low gas permeability. The ceramic fibers used for about 70% to 80% of the insulation throughout the fuel cell generator are preferably bulk alumino-silicate uniformly packed at a density between about 128 to 160 kg/cubic meter (8 to 10 pounds/cubic foot). Additionally, the external ducting is kept to a minimum to prevent heat losses, by integral entrance and exit conduits where, for example, an oxidant feed pre-heater could be easily bolted onto the oxidant inlet plenum entrance conduit. The top of the generator is designed to have a top lid comprising a metal cover and attached insulation allowing ease of access to the feed tubes and fuel cells.

BRIEF DESCRIPTION OF THE DRAWINGS

The above and other advantages of this invention will be more apparent from the following description in view of the drawings, where.

DESCRIPTION OF THE PREFERRED EMBODIMENTS

Figure 1:
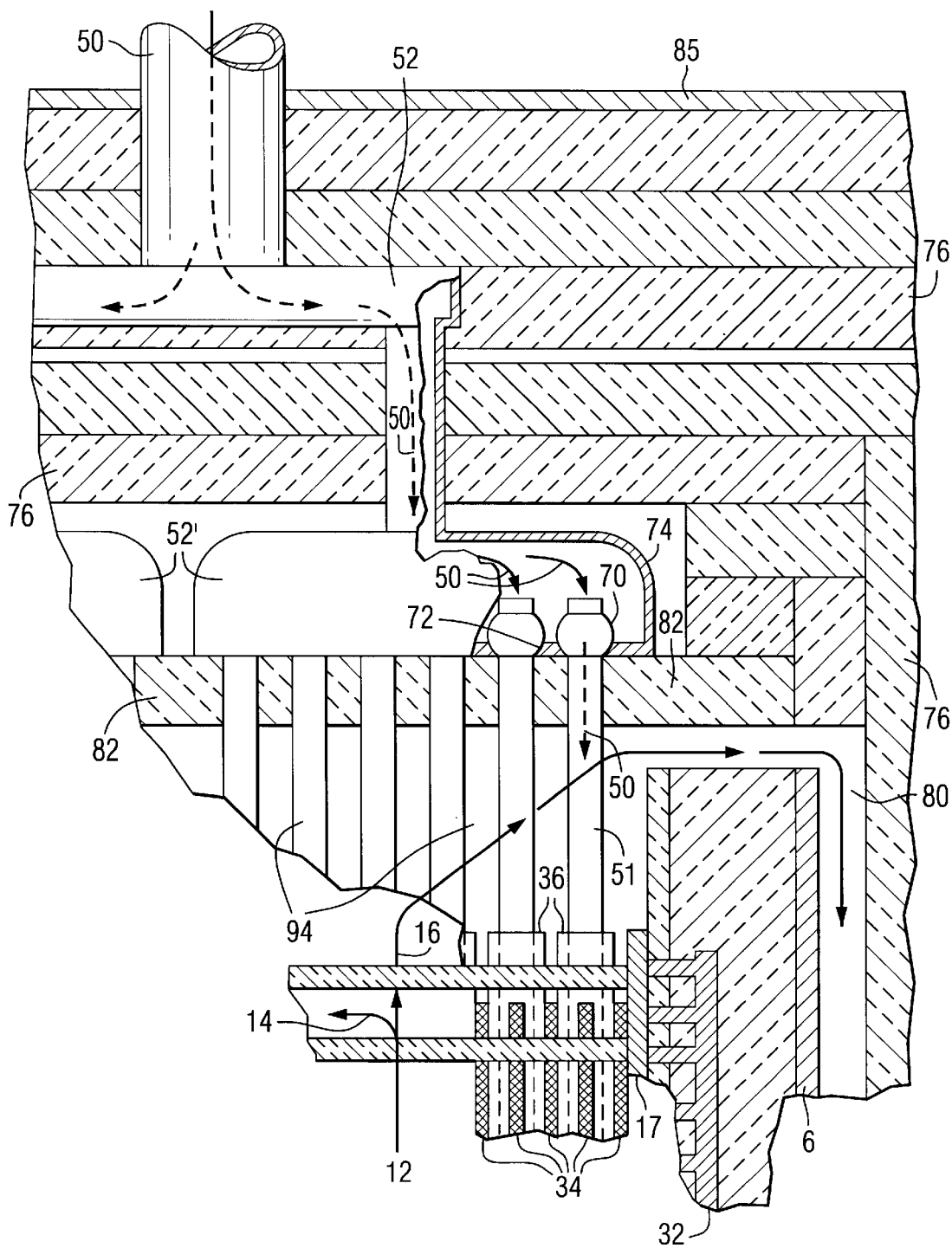
FIG. 1 is a side view in section of one embodiment of a prior art fuel cell generator showing power leads and fuel cell and oxidant feed tube positioning supports.
Figure 2:
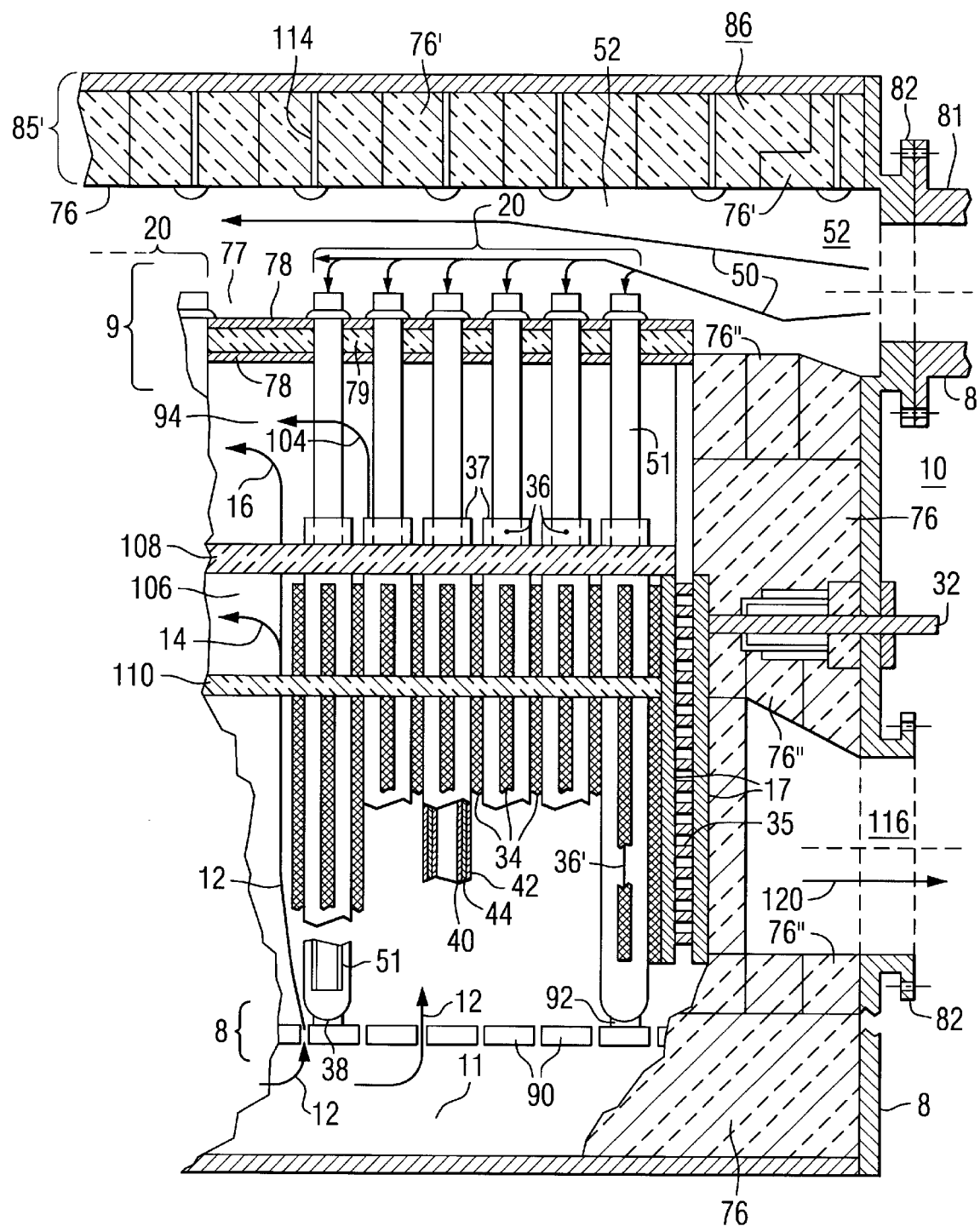
FIG. 2, which best shows the invention, is a side view in section of one embodiment of the fuel cell generator of the invention, showing power leads, top lid, fuel cell positioning boards and laminated oxidant feed tube positioning board.

Referring now to FIG. 2, prior art FIG. 1 having already been discussed, solid oxide fuel cell generator 10 is shown. It contains a plurality of fuel cell stacks 20 of fuel cells 36. Each fuel cell is in hollow, tubular, axially elongated form having an open top end 37 and a closed bottom end 38. The fuel cells contain interior self supporting air electrodes 40, usually of a doped $LaMnO_3$ ceramic, exterior fuel electrodes 42, usually of a nickel zirconia cermet, with solid electrolyte 44, usually of a stabilized zirconia, therebetween, as shown by the one fuel cell shown in cross section. The fuel cells operate on a feed oxidant 50, usually pre-heated air, and reformed fuel 12, usually internally or externally reformed to provide $H_2+CO$. The fuel passes from a bottom fuel inlet plenum 11, through fuel entry boards 90 having holes therethrough, at the bottom 8 of the fuel cell generator. These fuel entry boards can also help support the fuel cell bottoms 38 as at point 92.

A single oxidant inlet plenum 52 formed by enclosing insulation 76, 76' and 76" includes a bottom enclosing member 77, having holes for oxidant feed tubes 51 therethrough, which member 77 constitutes a laminated oxidant feed tube positioning board, located at the top portion 9 of the fuel cell generator. Below the oxidant feed tube positioning board 77 and above the fuel cells 36 is a reacted or spent oxidant/reacted or spent fuel exhaust chamber 94 which can also be a combustion chamber to heat incoming feed oxidant in the oxidant feed tubes 51. In operation, oxidant flows down the oxidant feed tubes 51 into the open end 37 of fuel cells 36, to the bottom 38 of the fuel cells where it reverse flows, contacting the inner air electrode 40, reacts to provide depleted oxidant 104 which exits the open end 37 of the fuel cells into oxidant/fuel exhaust chamber 94. The reformed fuel 12 passes outside of the fuel cells 36, contacting exterior fuel electrode 42, reacts to provide partly depleted fuel 14 some of which exits into fuel recirculation chamber 106 and depleted fuel 16 which exits into reacted oxidant/fuel exhaust (combustion) chamber 94.

Figure 3:
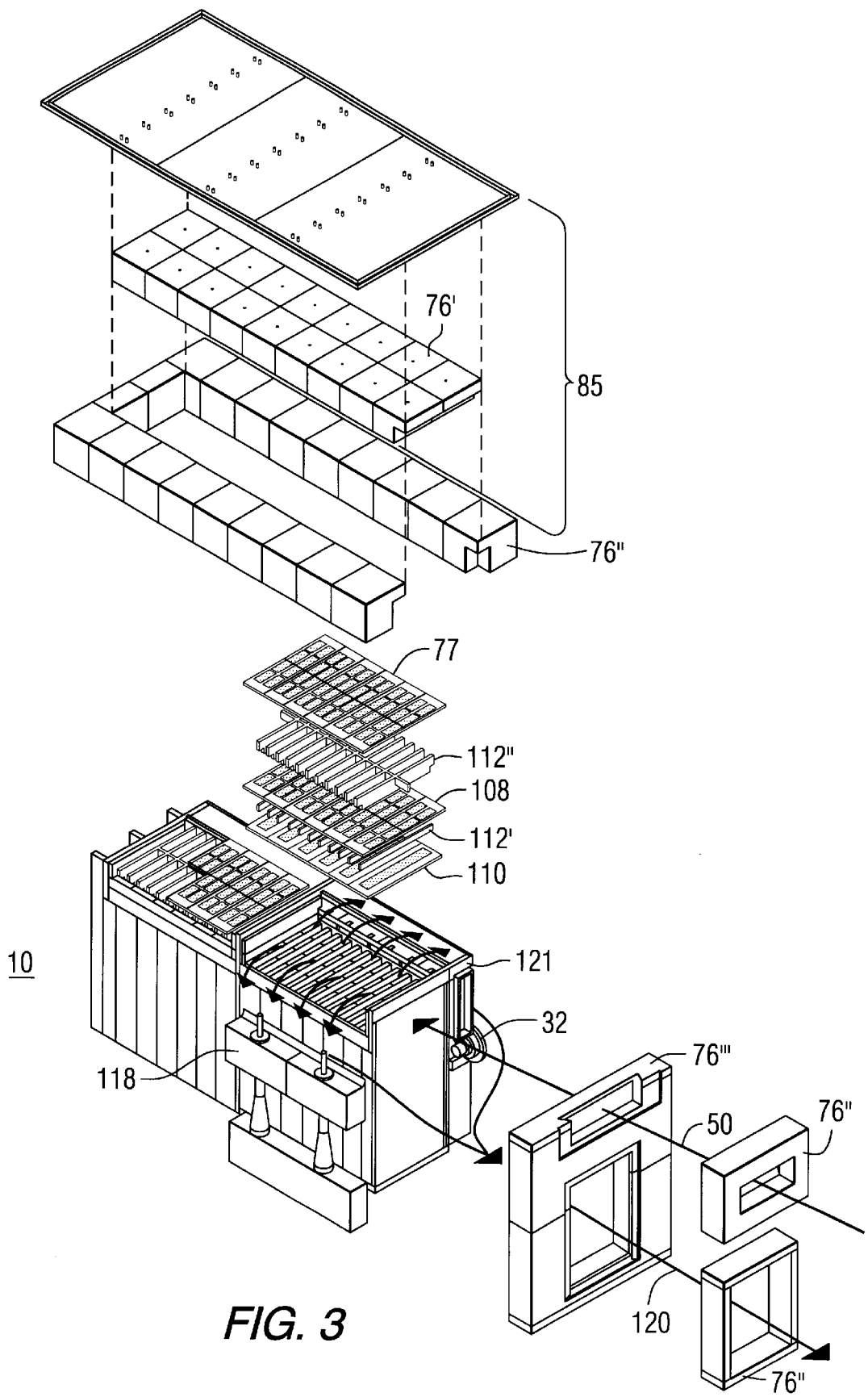
FIG. 3 is a three dimensional, detailed, exploded view of the fuel cell generator shown in FIG. 2.

The fuel cells 36 are partly supported by upper fuel cell positioning board 108 and lower fuel cell positioning board 110, defining the fuel recirculation chamber 106. The two fuel cell positioning boards 108 and 110 are spaced by vertical supports 112', not shown in FIG. 2, but shown in FIG. 3 and as mentioned previously, by fuel entry boards 90. The oxidant feed tube support board 77 structure is supported by vertical beams 112" as shown in FIG. 3. The oxidant feed tubes 51 pass through chamber 94 into the open center of the fuel cells. Insulation 76 most of it in bulk ceramic fiber form, about 70% by volume, surrounds all these components which are enclosed by a steel canister. However, to insure maximum rigidly, insulation 76' associated with the lid 85' is in block form held in place by welded support studs 114, and insulation 76" associated with the oxidant inlet plenum 52 and exhaust outlet 116 are also in block form.

The oxidant feed tube support board 77 is a laminate of at least two layers 78 and 79, where one thick layer 79 is "porous", that is about 70% to 85% porous and comprises oriented or randomly disposed alumino-silicate ceramic fibers bonded with a ceramic alumina binder. This layer confers properties of thermal insulation on the laminated board 77. The other thin layer 78 is a "dense", that is, 1% to 5% porous, woven ceramic sheet that is impregnated with ceramic adhesive. This "dense" layer 78 provides very low gas permeability as well as the ultimate strength to the finished laminated board by taking the bending load whereas the fibrous core layer 79 takes the shear load. As shown in FIG. 2, "porous" fibrous layer 79 can be disposed or sandwiched between two dense woven layers 78, or in a variety of other configurations.

Power leads 32, are shown, for the sake of simplicity in FIG. 2, on the side where oxidant inlet plenum 52 and exhaust outlet 116 are located, but physically are located on the back side of the fuel cell generator, as shown in FIG. 3. They are, however, electrically connected to each parallel bus bars 17 and to the fuel cells 36, through flexible power take-off connectors 35, which contact each fuel cell. The power leads 32 are transverse to the axis 36' of the fuel cells and are embedded in insulation material, as shown in FIG. 2. As shown in FIG. 2 external ducting 81 is kept to a minimum by integral entrance and exit conducts 82.

FIG. 3, further shows a pre-reformer assembly 118 into which fresh fuel (not shown in the Figure) and partly depleted fuel (not shown in the Figure) pass, with conduits for reformed fuel (not shown in the Figure) to exit to contact the fuel cells. Block insulation 76" around the oxidant inlet plenum and exhaust plenum 76'" are also shown in FIG. 3, as well as exhaust gas flow 120.

The generator of this invention improves the overall efficiency and performance of the power generation system, improves the assembly of the generator stack by reducing the number of installed parts, improves the functionality of the system, improves generator serviceability/maintainability, increases the availability of the fuel cell generator and ultimately offers a cost-effective solution to the pressing demand for compact, highly efficient, low cost SOFC systems.

As an example of operation, each stack would contain about 1152, 22 mm OD, 1500 mm active length tubular fuel cells, each generating over about 120 watts, arranged in 12 bundle-rows. Each stack would be fed from a fuel supply system including a recirculation plenum, ejector pumps, a pre-reformer, and a fuel manifold with riser tubes. Process air would be introduced through an inlet nozzle connected to a centrally located air plenum. The boundary between air and exhaust zones would be constituted by ceramic laminated boards as described previously which would support the air feed tube conveying the oxidant to the lower, closed-end of each fuel cell. The exhaust flow of each stack would be directed sideways (as shown in the FIG. 3) and subsequently collected into two large side ceramic manifolds of equal cross section. These manifolds would be supported both by the stack end boards and by the peripheral insulation system at the base. A large chamber 76''' located at one end of the stacks would collect both exhaust flows and redirect the stream to a centrally located outlet nozzle directly communicating with the shell side of a recuperator. Since the SOFC stack would operate at temperatures near 1000° C. degree, thermal insulation is required between the stack and the outer container to prevent high temperatures at the external walls and high heat loss. By utilizing bulk alumino-silicate ceramic fibers uniformly packed, it would be possible to maintain the outer container wall below 60° C. Both stacks would be surrounded by a metallic liner which would provide a barrier which would limit fuel bypass and diffusion into the peripheral insulation system. The liner would also constitute a barrier between high purity and low purity insulation materials and allow utilization of inexpensive insulation in the peripheral gap between stack and outer container. Another important feature of the stack liner would be to provide an efficient radiative heat transfer shield thus minimizing heat losses from the stack.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalent thereof.

What is claimed is:

1. A solid oxide fuel cell generator having a top portion containing a lid comprising:
   (1) stacks of hollow, tubular axially elongated fuel cells having a center and having an open top and closed bottom, with interior air electrodes and exterior fuel electrodes with solid electrolyte therebetween, which can operate on feed oxidant and reformed feed fuel to generate electricity;
   (2) a single oxidant inlet plenum formed by enclosing insulation, including a bottom enclosing member having holes therethrough constituting an oxidant feed tube positioning board, located at the top portion of the fuel cell generator;
   (3) a feed fuel inlet plenum connected to a fuel entry board having holes therethrough at the bottom of the fuel cells, through which feed fuel can pass, both located at the bottom portion of the fuel cell generator;
   (4) reacted oxidant/exhaust fuel chamber, located above the fuel cells and below the oxidant inlet plenum;
   (5) power leads electrically connected to the fuel cells transverse to the axis of the fuel cells;
   (6) a plurality of oxidant feed tubes supported by the oxidant feed tube positioning board and passing through the reacted oxidant/exhaust fuel chamber into the center of the fuel cells; and
   (7) two spaced fuel cell support positioning boards which provide a fuel recirculation chamber for passing part of exhaust fuel in the form of partly depleted fuel to a pre-reformer associated with the generator;
   all surrounded by insulation; and all within an outer generator enclosure; where there are at least two fuel cell stacks arranged in a row next to each other, the oxidant feed tube positioning board at the bottom of the oxidant inlet plenum is a composite sandwich of woven ceramic fiber sheets impregnated with ceramic adhesive bonded to a porous core of alumino-silicate ceramic fibers bonded with an inorganic binder, wherein the insulation constitutes, primarily ceramic fibers, and where the top portion of the generator has a lid comprising a metal cover and attached insulation, allowing access to the oxidant feed tubes and the fuel cells.

2. The fuel cell generator of claim 1, where the oxidant feed tube positioning board is a laminate of 70% to 85% porous alumino-silicate board and 1% to 5% porous impregnated woven ceramic sheets.

3. The fuel cell generator of claim 1, where the oxidant feed tube positioning board is a laminate of one porous bonded alumino-silicate fiber board and at least two contacting impregnated woven ceramic sheets.

4. The fuel cell generator of claim 1, where the oxidant feed tube positioning board is a laminate of one 70% to 85% porous bonded alumino-silicate fiber board and at least two contacting 1% to 5% porous impregnated woven ceramic sheets.

5. The fuel cell generator of claim 1, where feed fuel passes to an associated pre-reformer and then the fuel inlet plenum for the reformed fuel to contact the fuel electrode of the fuel cells, and where depleted exhaust fuel passes to the reacted oxidant/exhaust fuel chamber and partly depleted fuel passes to the fuel recirculation chamber.

6. The fuel cell generator of claim 1, where the power leads contact bus bars, where the bus bars are disposed parallel to the fuel cells and in electrical contact with metal felt connectors contacting each fuel cell.

7. The fuel cell generator of claim 1, where the ceramic fibers used for about 70% to 80% by volume of the insulation throughout the fuel cell generator are preferably alumino-silicate uniformly packed at a density between 128 to 160 kg/cubic meter.

* * * * *